US012568301B2

(12) United States Patent
Yang et al.

(10) Patent No.: US 12,568,301 B2
(45) Date of Patent: Mar. 3, 2026

(54) PHOTOGRAPHING FUNCTION CONTROL METHOD, PHOTOGRAPHING FUNCTION CONTROL DEVICE, AR APPARATUS AND STORAGE MEDIUM

(71) Applicant: GOERTEK INC., Weifang (CN)

(72) Inventors: Qinghe Yang, Weifang (CN); Xudong Qiu, Weifang (CN); Xiaofeng Guo, Weifang (CN)

(73) Assignee: GOERTEK INC., Weifang (CN)

( * ) Notice: Subject to any disclaimer, the term of this patent is extended or adjusted under 35 U.S.C. 154(b) by 203 days.

(21) Appl. No.: 18/552,450

(22) PCT Filed: Dec. 9, 2021

(86) PCT No.: PCT/CN2021/136624
§ 371 (c)(1),
(2) Date: Sep. 26, 2023

(87) PCT Pub. No.: WO2023/097724
PCT Pub. Date: Jun. 8, 2023

(65) Prior Publication Data
US 2024/0171850 A1    May 23, 2024

(30) Foreign Application Priority Data

Nov. 30, 2021    (CN) .......................... 202111447242.1

(51) Int. Cl.
*H04N 23/63* (2023.01)
*G02B 27/01* (2006.01)
*H04N 23/67* (2023.01)

(52) U.S. Cl.
CPC ....... *H04N 23/632* (2023.01); *G02B 27/0172* (2013.01); *H04N 23/67* (2023.01)

(58) Field of Classification Search
CPC ...... H04N 23/632; H04N 23/67; H04N 23/60; H04N 23/63; H04N 23/64; G02B 27/0172; G02B 27/017; G02B 2027/0138
See application file for complete search history.

(56) References Cited

U.S. PATENT DOCUMENTS

2010/0208127 A1    8/2010  Takada et al.
2015/0168728 A1*   6/2015  Kobayashi .............. G06F 3/012
                                                    345/156
(Continued)

FOREIGN PATENT DOCUMENTS

CN          105187725 A     12/2015
CN          105979154 A      9/2016
(Continued)

OTHER PUBLICATIONS

International Search Report from International Application No. PCT/CN2021/136624 mailed Aug. 26, 2022.

*Primary Examiner* — Gevell V Selby
(74) *Attorney, Agent, or Firm* — Shih IP Law Group, PLLC

(57) ABSTRACT

The present application discloses a method for controlling a photographing function, which is applied to an AR apparatus, the method comprising: if a photographing function calling instruction is received, activating a photographing device of the AR apparatus; setting a display status of the AR apparatus to a non-preview status, wherein, a currently displayed content of the AR apparatus does not include a photographing preview content in the non-preview status; determining whether a photographing instruction is received; if so, controlling the photographing device to perform an operation corresponding to the photographing instruction. According to the present application, the power consumption of the photographing function of the AR apparatus can be reduced, and the endurance can be improved.

(Continued)

The present application also discloses a device for controlling a photographing function, a storage medium and an AR apparatus which have the above beneficial effects.

9 Claims, 3 Drawing Sheets

(56)                    References Cited

U.S. PATENT DOCUMENTS

| | | | |
|---|---|---|---|
| 2015/0168729 A1* | 6/2015 | Kobayashi | G06F 1/1686 |
| | | | 345/156 |
| 2018/0054611 A1* | 2/2018 | Shin | H04N 13/344 |
| 2018/0084137 A1* | 3/2018 | Miyazaki | H04N 1/2145 |
| 2021/0142059 A1 | 5/2021 | Lee et al. | |
| 2022/0210328 A1* | 6/2022 | Anvaripour | G06F 3/00 |

FOREIGN PATENT DOCUMENTS

| | | | |
|---|---|---|---|
| CN | 106201238 A | 12/2016 |
| CN | 106791412 A | 5/2017 |
| CN | 111970456 A | 11/2020 |
| JP | 2004023165 A | 1/2004 |

* cited by examiner

PHOTOGRAPHING FUNCTION CONTROL METHOD, PHOTOGRAPHING FUNCTION CONTROL DEVICE, AR APPARATUS AND STORAGE MEDIUM

This application claims the priority of Chinese Patent Application No. 02111447242.1, titled "METHOD AND DEVICE FOR CONTROLLING PHOTOGRAPHING FUNCTION, AR APPARATUS AND STORAGE MEDIUM", filed on Nov. 30, 2021, which is incorporated by reference as if fully set forth herein.

TECHNICAL FIELD

The present application relates to the technical field of augmented reality, particularly, to a method for controlling a photographing function, a device for controlling a photographing function, an AR apparatus, and a storage medium.

BACKGROUND ART

AR (Augmented Reality) technology is a technology that integrates virtual information with the real world. An AR apparatus simulates virtual information such as text, image, 3D model, music, video, etc. generated by a computer and then applies the virtual information to the real world, and the two kinds of information complement to each other to enhance the real world.

With the development of AR, AR apparatus with a photographing apparatus are gradually widely used. Users can use the photographing device of the AR apparatus to conduct operations such as video conference, image photographing or the like. When the AR apparatus starts a photographing function, the preview content (that is, the content that can be captured currently) is generally rendered by an optical machine. However, the display of preview content needs to be refreshed frequently, which seriously affects the endurance period of AR apparatus.

Therefore, how to reduce the power consumption of the photographing function of the AR apparatus and improve the endurance period is technical problems need to be solved by those skilled in the art at present.

SUMMARY

An object of the present disclosure is to provide a method for controlling a photographing function, a device for controlling a photographing function, an AR apparatus, and a storage medium, which can reduce the power consumption of the photographing function of the AR apparatus and improve the endurance period.

In order to achieve the above object, the present disclosure provides a method for controlling a photographing function, which is applied to an AR apparatus. The method for controlling a photographing function includes:

if a photographing function calling instruction is received, activating a photographing device of the AR apparatus;

setting a display status of the AR apparatus to a non-preview status, wherein, a currently displayed content of the AR apparatus does not include a photographing preview content in the non-preview status;

determining whether a photographing instruction is received; and if the photographing instruction is received, controlling the photographing device to perform an operation corresponding to the photographing instruction.

Optionally, setting a display status of the AR apparatus to a non-preview status includes:

controlling an optical machine of the AR apparatus to display a black image so as to set the display status of the AR apparatus to the non-preview status.

Optionally, setting a display status of the AR apparatus to a non-preview status includes:

closing a preview data channel of the photographing device so as to set the display status of the AR apparatus to the non-preview status.

Optionally, the method for controlling a photographing function further includes:

setting the smallest area among a photographing area of the photographing device, an optical machine display area and a human eye observation area as a viewing area; and determining a viewing frame of the photographing device according to a boundary of the viewing area, and setting the viewing frame as the currently displayed content of the AR apparatus.

Optionally, after the step of setting the viewing frame as the currently displayed content of the AR apparatus, the method for controlling a photographing function further includes:

determining whether a focusing of the photographing device is finished;

if the focusing of the photographing device is finished, setting a color of the viewing frame to a first color; and if focusing of the photographing device is not completed, setting the color of the viewing frame to a second color.

Optionally, before the step of setting the smallest area among a photographing area of the photographing device, an optical machine display area and a human eye observation area as a viewing area, the method for controlling a photographing function further includes:

determining the photographing area of the photographing device according to a field of view of the photographing device;

determining the optical machine display area according to a field of view of the optical machine of the optical machine; and determining the human eye observation area according to a field of view of the human eye.

Optionally, after the step of controlling the photographing device to perform an operation corresponding to the photographing instruction, the method for controlling a photographing function further includes:

storing a photographing result collected by the photographing device to a storage space, and recording a focusing status of the photographing result, wherein the focusing status includes a focusing finished status and a focusing unfinished status.

The present disclosure also provides a device for controlling a photographing function, which is applied to an AR apparatus, the device for controlling a photographing function includes:

a photographing function activating module for activating a photographing device of the AR apparatus if a photographing function calling instruction is received;

a display control module for setting a display status of the AR apparatus to a non-preview status, wherein, a currently displayed content of the AR apparatus does not include a photographing preview content in the non-preview status; and a photographing module for determining whether a photographing instruction is received, and if the photographing instruction is received, controlling the photographing device to perform an operation corresponding to the photographing instruction.

The present disclosure also provides a storage medium on which a computer program is stored, wherein when the computer program is executed, the steps of the method for controlling a photographing function as described above are implemented.

The present disclosure also provides an electronic apparatus, including a memory and a processor, wherein a computer program is stored in the memory, and when the processor calls the computer program in the memory, the steps of the method for controlling a photographing function as described above are implemented.

The present disclosure provides a method for controlling a photographing function, which is applied to an AR apparatus, the method for controlling a photographing function includes: if a photographing function calling instruction is received, activating a photographing device of the AR apparatus; setting a display status of the AR apparatus to a non-preview status, wherein, the currently displayed content of the AR apparatus does not include a photographing preview content in the non-preview status; determining whether a photographing instruction is received; if the photographing instruction is received, controlling the photographing device to perform an operation corresponding to the photographing instruction.

The present disclosure is configured to start the photographing device of the AR apparatus after receiving the photographing function calling instruction, whereas in conventional solutions, the preview content of the photographing device is displayed after the AR apparatus starts the photographing device. In the present disclosure, after receiving the photographing instruction, the photographing device is controlled to perform the operation corresponding to the photographing instruction. Users can see the content displayed on the screen by the AR apparatus, and can also see an external scene. The present disclosure is configured to set the display status of the AR apparatus to a non-preview status after activating the photographing device, so that the currently displayed content of the AR apparatus does not include the photographing preview content. In addition, the present disclosure is configured to not display the preview content of the photographing device on the display screen of the AR apparatus after activating the photographing device, which accordingly can reduce the power consumption of the photographing function of the AR apparatus and improve the endurance. In the meanwhile, the present disclosure also provides a device for controlling a photographing function, an electronic device and a storage medium which have the above beneficial effects and will not be repeated herein.

BRIEF DESCRIPTION OF THE DRAWINGS

In order to more clearly describe the embodiments of the present disclosure, the following will briefly introduce the drawings required for the description of the embodiments. Obviously, the drawings in the following description are only some embodiments of the present disclosure. For persons of ordinary skill in the art, other drawings can also be obtained according to the provided drawings without any creative effort.

4

Figure 3:
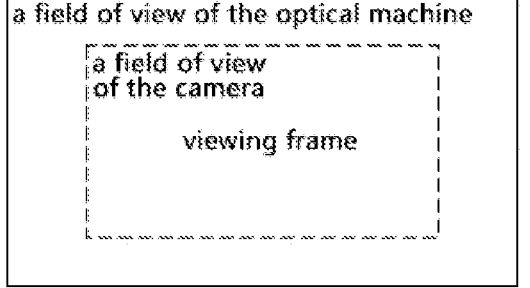
Figure 3:
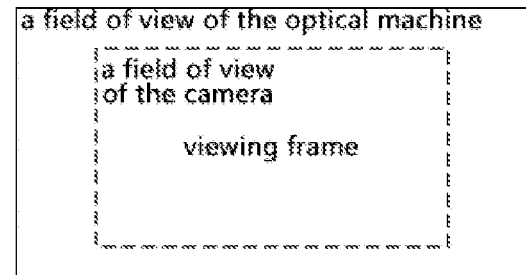
Figure 4:
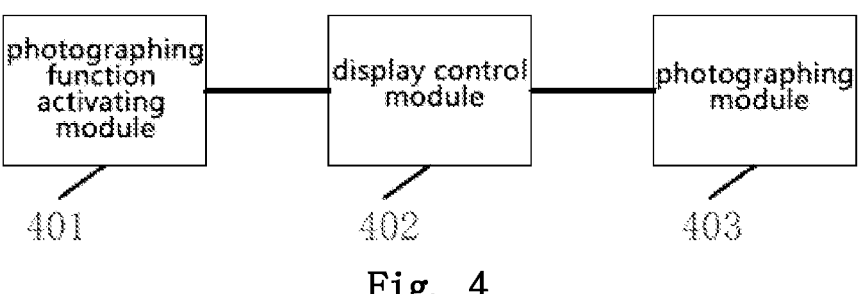

FIG. 3 is a schematic diagram of a method for setting a viewing frame according to an embodiment of the present disclosure;

FIG. 4 is a structural schematic diagram of a device for controlling a photographing function according to an embodiment of the present disclosure.

DETAILED DESCRIPTION OF THE EMBODIMENTS

In order to make the objects, technical solutions and advantages of the embodiments of the present disclosure more apparent, the following will describe the technical solutions in the embodiments of the present disclosure clearly and completely in combination with the drawings in the embodiments of the present disclosure. Obviously, the described embodiments are only part of the embodiments of the present disclosure, rather than all the embodiments. Based on the embodiments according to the present disclosure, all other embodiments obtained by persons of ordinary skill in the art without creative efforts shall fall within the protection scope of the present disclosure.

Figure 1:
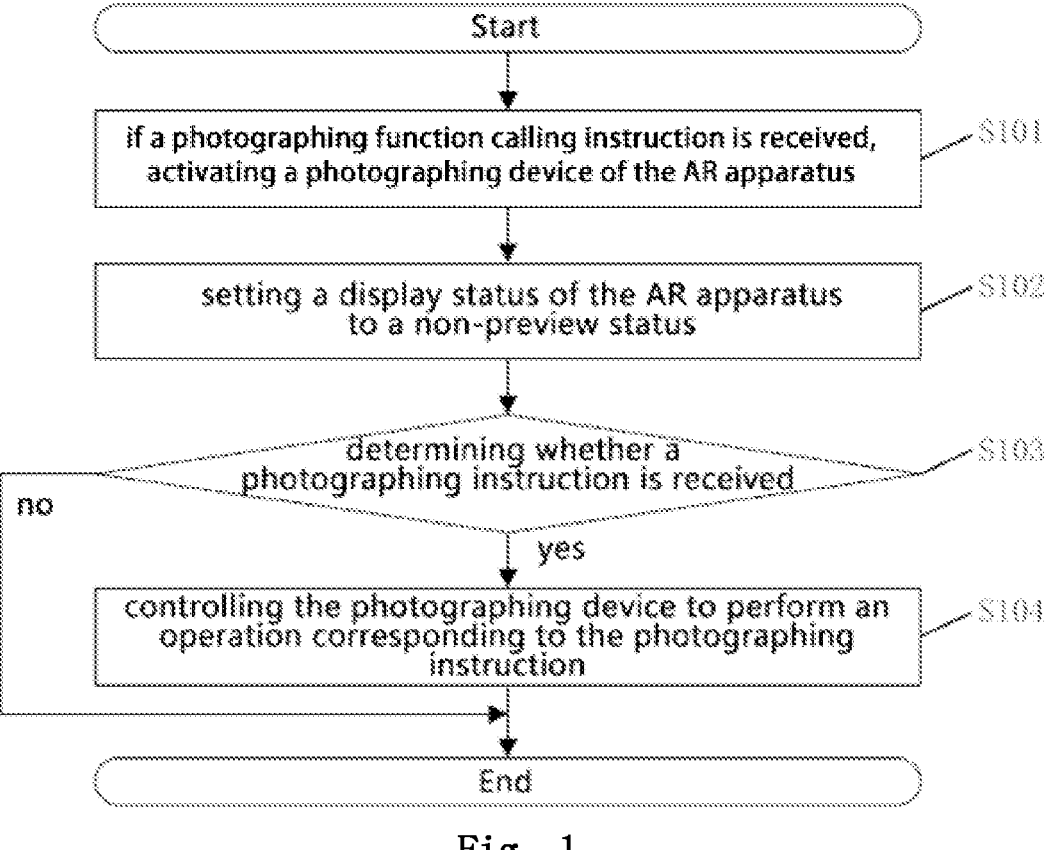
FIG. 1 is a flowchart of a method for controlling a photographing function according to an embodiment of the present disclosure.

Referring to FIG. 1, FIG. 1 is a flowchart of a method for controlling a photographing function according to an embodiment of the present disclosure.

The method includes the following specific steps:

S101: if a photographing function calling instruction is received, activating a photographing device of the AR apparatus;

wherein, the embodiment may be applied to the AR apparatus provided with a photographing apparatus, the user can transmit a photographing function calling instruction to the AR apparatus by manually triggering a button, or transmit the photographing function calling instruction to the AR apparatus through a smart terminal (such as a mobile phone, a tablet computer, etc.) connected with the AR apparatus, wherein the photographing function calling instruction is an instruction for activating the photographing device of the AR apparatus so as to capture a image or a video by using the photograph device.

Before receiving the photographing function calling instruction, the photographing device of the AR apparatus can be in turned-off status. After receiving the photographing function calling instruction, the photographing device can be started. As a feasible embodiment, the AR apparatus may include a plurality of photographing devices, and the embodiment can start the photographing device corresponding to the photographing function calling instruction.

Step S102: setting a display status of the AR apparatus to a non-preview status;

the present embodiment is configured to set the display status of the AR apparatus to a non-preview status after activating the photographing device of the AR apparatus, and the currently displayed content of the AR apparatus does not include a photographing preview content in the non-preview status.

As a feasible embodiment, the present embodiment may be configured to set the display status to a preview status at first, and then set the display status to a non-preview status after delaying by a preset time (such as 3 seconds), after activating the photographing device of the AR apparatus. Whereby, setting the display status to the preview status at first can assist the user to understand whether the photographing device normally operates, and then setting the display status to the non-preview status can achieve the effect of reducing the power consumption.

Step S103: determining whether a photographing instruction is received; and if a photographing instruction is received, then entering step S104.

Step S104: controlling the photographing device to perform an operation corresponding to the photographing instruction.

Wherein, the photographing device may be controlled to perform the operation corresponding to the photographing instruction to obtain a corresponding image or video, after receiving the photographing instruction. After obtaining a result of the operation corresponding to the photographing instruction, the operation result can be saved on local place or uploaded to the cloud. As a feasible embodiment, after it is determined the photographing instruction is not received at step S103, the present embodiment may determine once again whether the photographing instruction is received after delaying by a certain time (such as 0.5 s).

Due to the characteristics of the AR apparatus, the content displayed on the screen can be seen, and an external scene also can be seen. When a camera is turned on, it is not necessary to display the preview of the camera on the screen, so that user's experience is changed. Power consumption is a key indicator to evaluate whether the AR product is success, and power consumption directly affects the overall design. In order to control the AR power consumption, a low capacity battery is equipped. According to the present embodiment, it is not necessary to turn on the preview of the camera when the camera is turned on, which greatly reduces the power consumption.

The present disclosure is configured to start the photographing device of the AR apparatus after receiving the photographing function calling instruction, whereas in conventional solutions, the preview content of the photographing device is displayed after the AR apparatus starts the photographing device. In the present disclosure, after receiving the photographing instruction, the photographing device is controlled to perform the operation corresponding to the photographing instruction. Users can see the content displayed on the screen by the AR apparatus, and can also see an external scene. The present disclosure is configured to set the display status of the AR apparatus to a non-preview status after activating the photographing device, so that the currently displayed content of the AR apparatus does not include the photographing preview content. The present disclosure is configured to not display the preview content of the photographing device on the display screen of the AR apparatus after activating the photographing device, which accordingly can reduce the power consumption of the photographing function of the AR apparatus and improve the endurance.

As further introduction for the embodiment corresponding to FIG. 1, the display status of the AR apparatus can be set to the non-preview status in the following manners:

Manner 1: controlling an optical machine of the AR apparatus to display a black image so as to set the display status of the AR apparatus to the non-preview status. Wherein, due to the characteristics of the optical machine, when the optical machine displays a black image, the AR lens displays a transparent content thereon, and the AR apparatus does not need to render the content having colors.

Manner 2: closing a preview data channel of the photographing device so as to set the display status of the AR apparatus to the non-preview status.

In the present embodiment, it may also be configured to control an optical machine of the AR apparatus to display a black image and close a preview data channel of the photographing device so as to set the display status of the AR apparatus to the non-preview status.

As a further introduction for the embodiment corresponding to FIG. 1, since the preview content of the photographing device is not displayed in FIG. 1, therefore, in order to facilitate the user to determine a current photographable area, it can prompt the user of the current photographable content by displaying a viewing frame. Accordingly, the present disclosure can determine and display the viewing frame by the following manner: setting the smallest area among a photographing area of the photographing device, an optical machine display area and a human eye observation area as a viewing area; and determining a viewing frame of the photographing device according to a boundary of the viewing area, and setting the viewing frame as the currently displayed content of the AR apparatus. In the present embodiment, the photographing area of the photographing device can be determined according to a field of view of the photographing device, the optical machine display area can be determined according to a field of view of the optical machine of the AR apparatus, and the human eye observation area can be determined according to a field of view of the user's eye.

Further, after setting the viewing frame to the currently displayed content of the AR apparatus, it can also be determined whether the focusing of the photographing device is finished. If the focusing of the photographing device is finished, setting the color of the viewing frame to a first color, and if the focusing of the photographing device is not finished, setting the color of the viewing frame to a second color. The present embodiment can prompt the user whether the focusing has been finished by changing the color of the viewing frame.

Further, after controlling the photographing device to perform the operation corresponding to the photographing instruction, a photographing result collected by the photographing device can be stored to a storage space, and a focusing status of the photographing result can be recorded, wherein the focusing status includes a focusing finished status and a focusing unfinished status.

The processes described in the above-mentioned embodiments will be explained below through embodiments in practical applications. The present embodiment provides a camera preview scheme for an AR apparatus, since the AR apparatus can see an external scene, it is not necessary to display the preview of the camera on the screen when the camera is turned on. In the present embodiment, the viewing frame is determined by comparing the field of view (fov) of the camera, the field of view of the optical machine and the field of view of the human eye, and the viewing frame is displayed on the optical machine, effectively reducing the power consumption of the whole machine.

Figure 2:
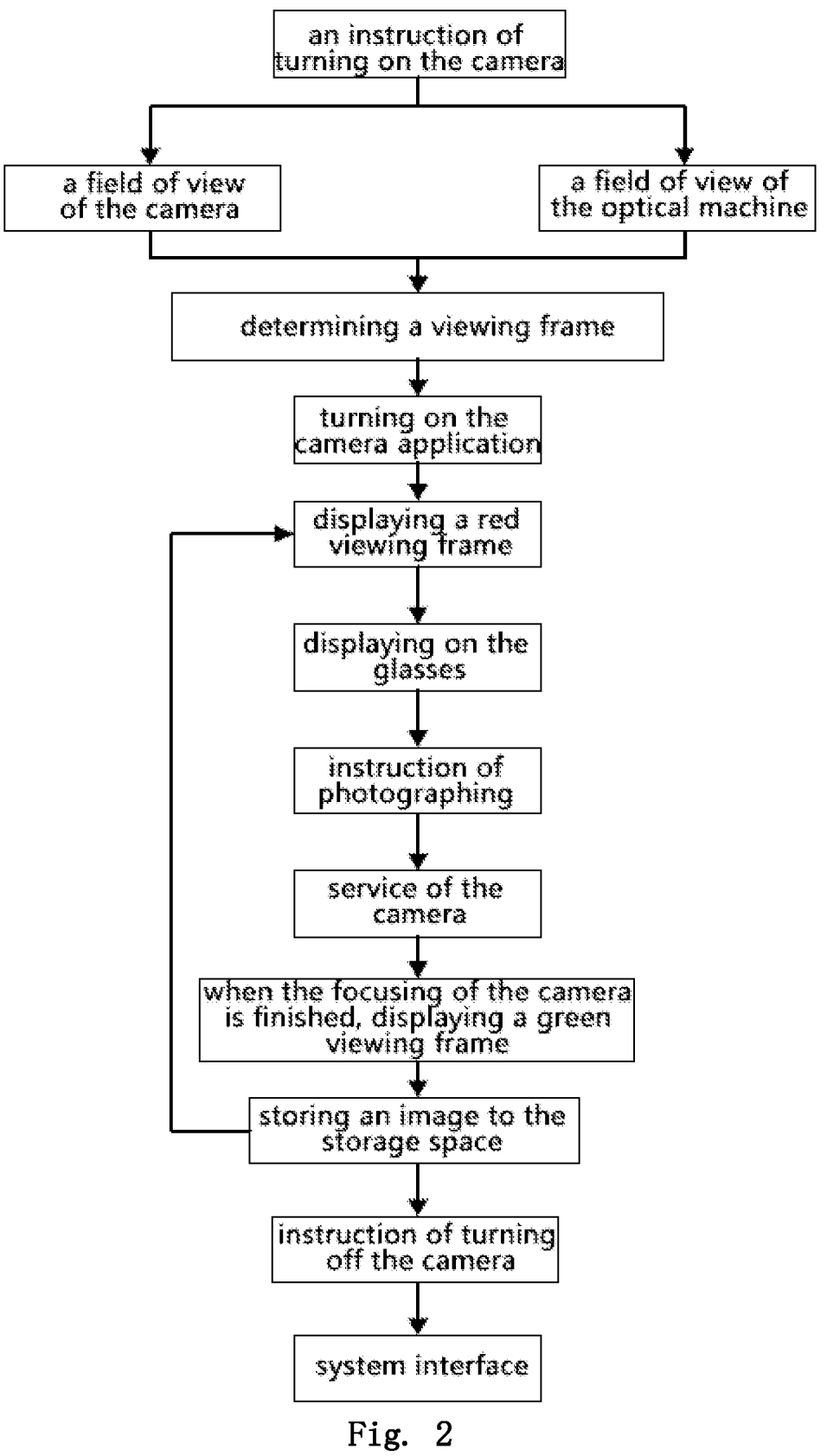
FIG. 2 is a flowchart of a method for controlling a camera of an AR apparatus according to an embodiment of the present disclosure.

Referring to FIG. 2, FIG. 2 is a flowchart of a method for controlling a camera of an AR apparatus according to an embodiment of the present disclosure. The present embodiment may include the following steps:

Step 1: receiving an instruction of turning on the camera, and determining a viewing frame according to a fov (field of view) range of the optical machine and a fov range of the camera. If the fov of the optical machine is greater than the fov of the camera, taking the fov of the camera as the viewing frame. Otherwise, taking the fov of the optical machine as the viewing frame. Referring to FIG. 3, FIG. 3 is a schematic diagram of a method for setting a viewing frame according to an embodiment of the present disclosure. In the present embodiment, a boundary of the smallest range among the fov of the optical machine and the fov of the camera is selected as the viewing frame (dotted line box in FIG. 3).

Step 2: turning on the camera application and setting a non-preview mode.

Step 3: displaying a red viewing frame on the display screen according to the fov range in step 1.

Step 4: receiving a photographing instruction and calling a photographing service of the camera.

Step 5: when the focusing of the camera is finished, displaying a green viewing frame.

Step 6: storing an image to the storage space after the camera photographs an image.

Step 7: when an instruction of turning off the camera is received, turning off the camera and controlling the display system interface of the optical machine.

In the above process, a black image with a finder indicator frame may be displayed on the screen, or the camera preview data channel may be closed, and accordingly the AR apparatus is set to a non-preview mode. Due to the characteristics of the optical machine, the black image area does not display content and no light emitted out of there. That is, only a red viewing frame pattern is displayed on the spectacle lens through the light, and the human eye can see the outside world through these areas of the spectacle lens. When receiving a photographing instruction such as a voice, a key or a gesture or the like, the displayed image is changed from the red frame to a green frame (the focusing is finished), then the background camera application acquires the image and stores it in the storage space.

Referring to FIG. 4, FIG. 4 is a structural schematic diagram of a device for controlling a photographing function according to an embodiment of the present disclosure.

The device for controlling a photographing function may include:

a photographing function activating module 401 for activating a photographing device of the AR apparatus if a photographing function calling instruction is received;

a display control module 402 for setting a display status of the AR apparatus to a non-preview status, wherein, the currently displayed content of the AR apparatus does not include a photographing preview content in the non-preview status; and a photographing module 403 for determining whether a photographing instruction is received; if the photographing instruction is received, controlling the photographing device to perform an operation corresponding to the photographing instruction.

In the present disclosure, the photographing device of the AR apparatus is started after receiving the photographing function calling instruction, whereas in conventional solutions, the preview content of the photographing device is displayed after the AR apparatus starts the photographing device. In the present disclosure, after receiving the photographing instruction, the photographing device is controlled to perform the operation corresponding to the photographing instruction. Users can see the content displayed on the screen by the AR apparatus, and in the meanwhile, the user can also see an external scene. In the present disclosure, after activating the photographing device, the display status of the AR apparatus is set to a non-preview status, so that the currently displayed content of the AR apparatus does not include the photographing preview content. In the present disclosure, after activating the photographing device, the preview content of the photographing device is not displayed on the display screen of the AR apparatus, which accordingly can reduce the power consumption of the photographing function of the AR apparatus and improve the endurance.

Further, the display control module 402 includes:

a first control unit for controlling the optical machine of the AR apparatus to display a black image, so as to set the display status of the AR apparatus to the non-preview status;

and/or, a second control unit for closing the preview data channel of the photographing device so as to set the display status of the AR apparatus to the non-preview status.

Further, the device for controlling a photographing function further includes:

a viewing frame setting module for setting the smallest area among a photographing area of the photographing device, an optical machine display area and a human eye observation area as a viewing area, and determining a viewing frame of the photographing device according to a boundary of the viewing area, and setting the viewing frame as the currently displayed content of the AR apparatus.

Further, the device for controlling a photographing function further includes:

a focusing module for determining whether the focusing of the photographing device is finished after setting the viewing frame as the currently displayed content of the AR apparatus; if the focusing of the photographing device is finished, setting the color of the viewing frame to a first color, and if the focusing of the photographing device is not finished, setting the color of the viewing frame to a second color.

Further, the device for controlling a photographing function further includes:

a display area setting module for determining the photographing area of the photographing device according to a field of view of the photographing device, determining the optical machine display area according to a field of view of the optical machine of the AR apparatus, and determining the human eye observation area according to a field of view of the user' eyes, before setting the smallest area among a photographing area of the photographing device, an optical machine display area and a human eye observation area as a viewing area.

Further, the device for controlling a photographing function further includes:

a storage module for storing a photographing result collected by the photographing device to a storage space, and recording a focusing status of the photographing result, after controlling the photographing device to perform an operation corresponding to the photographing instruction, wherein the focusing status includes a focusing finished status and a focusing unfinished status.

Since the embodiments of the device correspond to the embodiments of the method with each other, the description for the embodiments of the device may be referred to the embodiments of the method, and will not be repeated herein.

The present disclosure also provides a storage medium on which a computer program is stored, wherein when the computer program is executed, the steps provided in the above embodiments can be implemented. The storage medium may include various medias that can store program code such as a USB flash disk, a mobile hard disk, a Read Only Memory (ROM), a Random Access Memory (RAM), a magnetic disc or an optical disc.

The present disclosure also provides an AR apparatus including a memory and a processor, wherein a computer program is stored in the memory, and when the processor calls the computer program in the memory, the steps provided in the above embodiments can be implemented. Of course, the AR apparatus may also include various network interfaces, power supplies and other components.

In the specification, each embodiment is described in a progressive manner. Each embodiment focuses on the differences with other embodiments. The same or similar parts of each embodiment can be referred to each other. For the device disclosed in the embodiment, since it corresponds to the method disclosed in the embodiment, the description of the device is relatively simple, and the relevant contents can be referred to the description of the method. It should be noted that for those skilled in the art, certain improvements and modifications can be made to the disclosure without departing from the principle of the present disclosure, and these improvements and modifications also fall within the protection scope defined by the claims of the disclosure.

It should also be noted that relational terms such as first, second, and the like are only used to distinguish one entity or operation from another entity or operation herein, and do not necessarily require or imply any such actual relationship or order between these entities or operations. Moreover, the terms "including", "comprising", or any other variant thereof are intended to cover non-exclusive inclusion, so that a process, method, article, or device including a series of elements not only includes those elements, but also includes other elements not explicitly listed, or also includes elements inherent to such process, method, article or device. Without further restrictions, the element defined by the statement "include a . . . " do not exclude the presence of another identical elements in the process, method, article, or device including the elements.

What is claimed is:

1. A method for controlling a photographing function, which is applied to an AR apparatus, the method for controlling a photographing function comprises:
   if a photographing function calling instruction is received, activating a photographing device of the AR apparatus;
   setting a display status of the AR apparatus to a non-preview status, wherein, a currently displayed content of the AR apparatus does not comprise a photographing preview content in the non-preview status;
   determining whether a photographing instruction is received; and
   if the photographing instruction is received, controlling the photographing device to perform an operation corresponding to the photographing instruction,
   wherein, after controlling the photographing device to perform an operation corresponding to the photographing instruction, the method for controlling a photographing function further comprises:
   storing a photographing result collected by the photographing device to a storage space, and recording a focusing status of the photographing result, wherein the focusing status comprises a focusing finished status and a focusing unfinished status.

2. The method for controlling a photographing function of claim 1, wherein setting a display status of the AR apparatus to a non-preview status comprises:
   controlling an optical machine of the AR apparatus to display a black image so as to set the display status of the AR apparatus to the non-preview status.

3. The method for controlling a photographing function of claim 1, wherein setting a display status of the AR apparatus to a non-preview status comprises:
   closing a preview data channel of the photographing device so as to set the display status of the AR apparatus to the non-preview status.

4. The method for controlling a photographing function of claim 1, further comprising:
   setting the smallest area among a photographing area of the photographing device, an optical machine display area and a human eye observation area as a viewing area; and
   determining a viewing frame of the photographing device according to a boundary of the viewing area, and setting the viewing frame as the currently displayed content of the AR apparatus.

5. The method for controlling a photographing function of claim 4, wherein, after setting the viewing frame as the currently displayed content of the AR apparatus, the method for controlling a photographing function further comprises:
   determining whether a focusing of the photographing device is finished;
   if the focusing of the photographing device is finished, setting a color of the viewing frame to a first color; and
   if the focusing of the photographing device is not finished, setting the color of the viewing frame to a second color.

6. The method for controlling a photographing function of claim 4, wherein, before setting the smallest area among a photographing area of the photographing device, an optical machine display area and a human eye observation area as a viewing area, the method for controlling a photographing function further comprises:
   determining the photographing area of the photographing device according to a field of view of the photographing device;
   determining the optical machine display area according to a field of view of the optical machine of the AR apparatus; and
   determining the human eye observation area according to a field of view of user' eyes.

7. A device for controlling a photographing function, which is applied to an AR apparatus, the device for controlling a photographing function comprises:
   a photographing function activating module for activating a photographing device of the AR apparatus if a photographing function calling instruction is received;
   a display control module for setting a display status of the AR apparatus to a non-preview status, wherein, a currently displayed content of the AR apparatus does not comprise a photographing preview content in the non-preview status;
   a photographing module for determining whether a photographing instruction is received, and if the photographing instruction is received, controlling the photographing device to perform an operation corresponding to the photographing instruction; and
   a storage module, after controlling the photographing device to perform an operation corresponding to the photographing instruction, storing a photographing result collected by the photographing device to a storage space, and recording a focusing status of the photographing result, wherein the focusing status comprises a focusing finished status and a focusing unfinished status.

8. An AR apparatus, comprising a memory and a processor, a computer program is stored in the memory, and when the processor calls the computer program in the memory, steps of the method for controlling a photographing function of claim 1 are implemented.

9. A storage medium, on which a computer executable instruction is stored, and when the computer executable instruction is loaded and executed by a processor, steps of the method for controlling a photographing function of claim 1 are implemented.

\* \* \* \* \*